US011987230B2

(12) United States Patent
Son et al.

(10) Patent No.: US 11,987,230 B2
(45) Date of Patent: May 21, 2024

(54) VEHICLE INCLUDING ELECTRIC MOTOR AND METHOD OF CONTROLLING THE SAME

(71) Applicants: HYUNDAI MOTOR COMPANY, Seoul (KR); KIA CORPORATION, Seoul (KR)

(72) Inventors: Hui Un Son, Suwon-si (KR); Joo Young Kim, Hwaseong-si (KR); Sang Joon Kim, Seoul (KR); Jea Mun Lee, Seoul (KR); Sung Hoon Yu, Hwaseong-si (KR); Joon Young Park, Seoul (KR); Kyu Hwan Jo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 279 days.

(21) Appl. No.: 17/373,922

(22) Filed: Jul. 13, 2021

(65) Prior Publication Data
US 2022/0063589 A1 Mar. 3, 2022

(30) Foreign Application Priority Data
Aug. 26, 2020 (KR) .................. 10-2020-0107878

(51) Int. Cl.
*B60W 20/00* (2016.01)
*B60W 20/20* (2016.01)
(Continued)

(52) U.S. Cl.
CPC ...... *B60W 20/20* (2013.01); *B60W 30/18027* (2013.01); *B60W 30/18072* (2013.01);
(Continued)

(58) Field of Classification Search
CPC ........... B60W 20/20; B60W 30/18027; B60W 30/18072; B60W 50/14; B60W 60/001;
(Continued)

(56) References Cited

U.S. PATENT DOCUMENTS 10,906,557 B1 *  2/2021  Aunkst ................ B60W 50/16
10,994,747 B2 *  5/2021  Augst .................. B60W 50/16
(Continued)

FOREIGN PATENT DOCUMENTS

JP   2013226052 A * 10/2013 ............. B60L 15/20
KR   10-1338647       12/2013
(Continued)

OTHER PUBLICATIONS

H. Fujimoto and S. Sato, "Pitching control method based on quick torque response for electric vehicle," The 2010 International Power Electronics Conference—ECCE ASIA—, Sapporo, Japan, 2010, pp. 801-806, doi: 10.1109/IPEC.2010.5543309. (Year: 2010).*

(Continued)

*Primary Examiner* — Elaine Gort
*Assistant Examiner* — Brittany Renee Peko
(74) *Attorney, Agent, or Firm* — Lempia Summerfield Katz LLC

(57) ABSTRACT

Disclosed are a vehicle including an electric motor and a method of controlling the same for providing a notification function to an occupant of the vehicle by controlling a pitching motion of a vehicle body. The method includes calculating a first torque value for providing the pitching motion based on driving state information including a vehicle speed, a driving mode, and an environment of a driving road; calculating a second torque value based on a request of a driver; and calculating a final torque value for controlling the electric motor based on the first torque value and the second torque value.

17 Claims, 7 Drawing Sheets

(51) Int. Cl.
*B60W 30/18* (2012.01)
*B60W 50/14* (2020.01)
*B60W 60/00* (2020.01)

(52) U.S. Cl.
CPC .......... *B60W 50/14* (2013.01); *B60W 60/001* (2020.02); *B60W 2510/244* (2013.01); *B60W 2520/10* (2013.01); *B60W 2520/16* (2013.01); *B60W 2540/10* (2013.01); *B60W 2540/215* (2020.02); *B60W 2552/15* (2020.02); *B60W 2555/60* (2020.02); *B60W 2710/083* (2013.01); *B60W 2720/106* (2013.01)

(58) Field of Classification Search
CPC ....... B60W 2510/244; B60W 2520/10; B60W 2520/16; B60W 2540/10; B60W 2540/215; B60W 2552/15; B60W 2555/60; B60W 2710/083; B60W 2720/106; B60W 2540/12; B60W 10/02; B60W 10/08; B60W 10/10; B60W 20/15; B60W 30/02; B60W 30/025; B60W 30/16; B60W 50/10; B60W 10/06; B60W 30/182; B60W 40/08; B60W 40/109; B60W 40/11; B60W 2720/16; B60K 2006/4825; B60K 6/48; B60L 15/20; B60L 2240/12; B60L 2240/14; B60L 2240/423; B60L 2240/48; B60L 2240/642; B60L 2260/20; B60Y 2200/91; B60Y 2300/18066; B60Y 2300/182
See application file for complete search history.

(56) References Cited

U.S. PATENT DOCUMENTS

| | | | |
|---|---|---|---|
| 11,584,386 B2* | 2/2023 | Chiba | B60W 50/12 |
| 2019/0308555 A1* | 10/2019 | Martin | B60Q 9/008 |
| 2020/0290646 A1* | 3/2020 | Safour | B60W 60/0051 |
| 2021/0016790 A1* | 1/2021 | Aunkst | B60W 50/16 |

FOREIGN PATENT DOCUMENTS

| | | |
|---|---|---|
| KR | 10-2014-0029834 | 3/2014 |
| KR | 10-2015-0064041 | 6/2015 |
| KR | 10-1559487 | 10/2015 |
| KR | 10-2016-0003780 | 1/2016 |
| KR | 10-2016-0034309 | 3/2016 |

OTHER PUBLICATIONS

M. Corno, L. D'Avico, G. Panzani and S. M. Savaresi, "A haptic-based, safety-oriented, braking assistance system for road bicycles," 2017 IEEE Intelligent Vehicles Symposium (IV), Los Angeles, CA, USA, 2017, pp. 1189-1194, doi: 10.1109/IVS.2017.7995874. (Year: 2017).*

* cited by examiner

VEHICLE INCLUDING ELECTRIC MOTOR AND METHOD OF CONTROLLING THE SAME

CROSS-REFERENCE TO RELATED APPLICATIONS

This application claims priority to and the benefit of Korean Patent Application No. 10-2020-0107878, filed on Aug. 26, 2020, the entire contents of which are incorporated herein by reference.

FIELD

The present disclosure relates to a vehicle including an electric motor and a method of controlling the same for providing a notification function to an occupant of a vehicle.

The statements in this section merely provide background information related to the present disclosure and may not constitute prior art.

Vehicles provide various pieces of information in order to improve safety and convenience and to satisfy needs of drivers while driving. The information provided by a vehicle is provided as visual information using a display or audible information using voice, alarm, or the like.

Recently, technology for providing haptic feedback to a driver through an accelerator pedal has been proposed. A haptic feedback function of the accelerator pedal provides driving-related information to a driver by deliberately providing repulsion when the driver presses the accelerator pedal. For example, the driver may be informed that fuel efficiency drops disproportionally when pressing the accelerator pedal above a specific position or may be guided that a drivetrain is switched from a motor to an engine or from the engine to the motor. Since the haptic feedback function does not impede sight or hearing, it is advantageously possible to prevent driver's attention from being distracted and to achieve intuitive recognition.

However, in order to add a haptic feedback function to the accelerator pedal, it is inevitable to add parts and change the design, and thus the cost is disadvantageously increased. We have discovered that since an accelerator pedal is not manipulated during autonomous driving, it is not possible to provide a haptic function using a haptic pedal, and there is a problem in that a separate haptic device is required when information needs to be conveyed to all occupants as well as a driver.

SUMMARY

The present disclosure is directed to a vehicle including an electric motor and a method of controlling the same for providing a notification function to an occupant of the vehicle by controlling a motion of a vehicle body using a motor of the vehicle without additional separate hardware.

In particular, the present disclosure is provides a vehicle including an electric motor and a method of controlling the same for receiving information in haptic form without pedal manipulation by achieving a haptic function through a pitching motion of a vehicle body, simultaneously transferring information to occupants as well as a driver, minimizing a sound in a baby mode, an occupant sleeping mode, or the like with regard to notification functions using a sound, and providing a notification function through a pitching motion.

The technical problems solved by the forms are not limited to the above technical problems and other technical problems which are not described herein will become apparent to those skilled in the art from the following description.

In one form of the present disclosure, a method of controlling a vehicle including an electric motor includes: calculating, by a controller, a first torque value for providing a pitching motion based on driving state information including a vehicle speed of the vehicle, a driving mode of the vehicle, and an environment of a driving road on which the vehicle travels; calculating, by the controller, a second torque value based on a request of a driver of the vehicle; and calculating, by the controller, a final torque value for controlling the electric motor based on the first torque value and the second torque value.

In another aspect of the present disclosure, a vehicle including an electric motor includes: a mode determiner configured to determine a pitching motion mode based on driving state information including a vehicle speed, a driving mode, and an environment of a driving road; a first calculator configured to calculate a first torque value for providing a pitching motion based on the determined pitching motion mode and the driving state information; and a second calculator configured to calculate a final torque value for controlling a motor based on the first torque value and a second torque value calculated based on a request of a driver.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
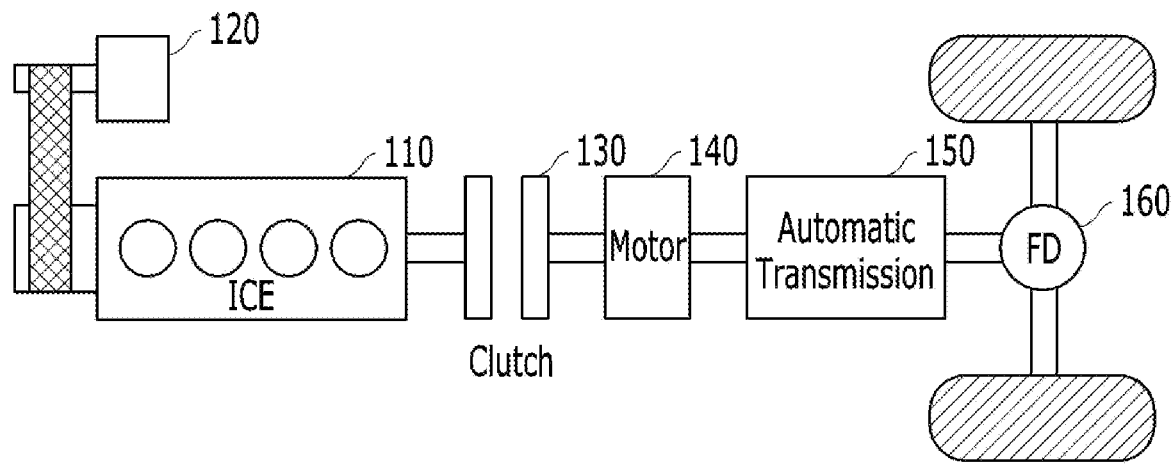
FIG. 1 is a block diagram showing an example of the configuration of a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the forms of the present disclosure will be described in detail with reference to the accompanying drawings so as to be easily implemented by those skilled in the art. However, the present disclosure may be variously implemented, and is not limited to the exemplary forms described herein. In the drawings, in order to clearly describe the present disclosure, portions which are not related to the description of the present disclosure will be omitted, and similar portions are denoted by similar reference numerals throughout the specification.

Throughout the specification, when a certain portion is said to "include" a certain component, this does not indicate that other components are excluded, and the same may be further included unless specifically described to the contrary. The same reference numbers will be used throughout the drawings to refer to the same or like parts.

Forms of the present disclosure propose technology for providing a notification function to an occupant of a vehicle by controlling a pitching motion of a vehicle body using a motor of the vehicle without additional separate hardware in a vehicle including an electric motor, such as a hybrid electric vehicle/plug-in hybrid electric vehicle (HEV/PHEV) or an electric vehicle (EV).

FIG. 1 is a block diagram showing an example of the configuration of a vehicle according to one form of the present disclosure. In the following description including FIG. 1, a vehicle type is assumed to be a hybrid vehicle, but this is merely for convenience of description, and forms may also be applied to any eco-friendly vehicle including an electric motor.

FIG. 1 illustrates a powertrain of a hybrid vehicle employing a parallel type hybrid system including an electric motor (or a driving motor) 140 and an engine clutch (EC) 130 that are installed between an internal combustion engine (ICE) 110 and a transmission 150.

In such a vehicle, in general, when a driver presses an accelerator after starting the vehicle, the driving motor 140 is driven using power of a battery while the engine clutch 130 is open and transmits power to move wheels through the transmission 150 and a final drive (FD) 160 (i.e., EV mode). As the vehicle gradually accelerates, high traction force is further required, in which case a starter generator motor 120 may be operated to drive the engine 110.

Accordingly, when the rotational speeds of the engine 110 and the motor 140 are the same, the engine clutch 130 is then engaged such that both the engine 110 and the motor 140 drive the vehicle (i.e., transition to an HEV mode from an EV mode). When a predetermined engine off condition, such as vehicle deceleration, is satisfied, the engine clutch 130 is opened and the engine 110 stops (i.e., transition to an EV mode from an HEV mode). In addition, the hybrid vehicle converts traction force of a wheel into electric energy to recharge the battery, which is referred to as braking energy regeneration or regenerative braking.

The starter generator motor 120 functions as a starter motor when the engine is turned on and functions as a generator after the engine is turned on or when rotational energy is recovered during engine off, and thus, the starter generator motor 120 may also be referred to as a hybrid starter generator (HSG), and as necessary, may be referred to as an auxiliary motor.

Figure 2:
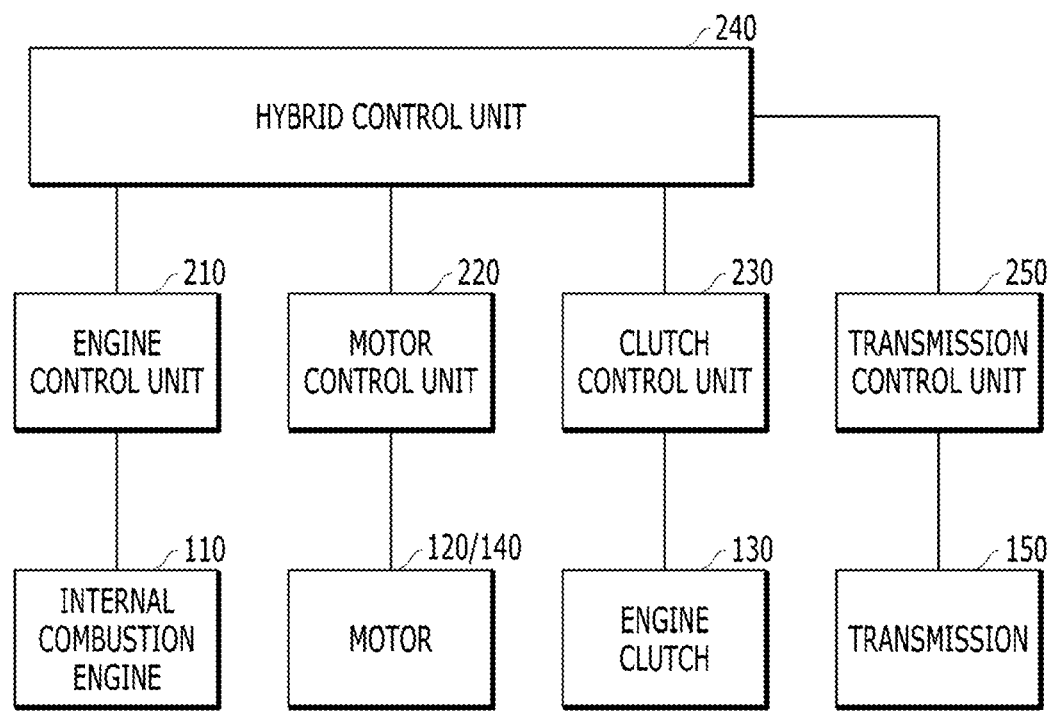
FIG. 2 is a block diagram showing an example of a control system of a hybrid vehicle to which forms of the present disclosure are applicable.

A relationship among controllers of a vehicle including such a powertrain is shown in FIG. 2.

FIG. 2 is a block diagram showing an example of a control system of a hybrid vehicle to which forms of the present disclosure are applicable.

Referring to FIG. 2, in the hybrid vehicle to which forms of the present disclosure are applicable, the internal combustion engine 110 may be controlled by an engine controller 210, the torque of the starter generator motor 120 and the driving motor 140 may be controlled by a motor control unit (MCU) 220, and the engine clutch 130 may be controlled by a clutch controller 230. Here, the engine controller 210 may also be referred to as an engine management system (EMS). In addition, the transmission 150 may be controlled by a transmission controller 250. In one form, a controller for the starter generator motor 120 and a controller for the driving motor 140 may also be separately configured.

Each controller may be connected to a hybrid control unit (HCU) 240 for controlling an overall mode-switching procedure as a high-level controller and may provide, to the HCU 240, information desired to switch driving modes and to control an engine clutch during gear shifting, and/or information desired to control engine off, or may perform an operation according to a control signal under the control of the HCU 240.

In more detail, the HCU 240 may determine whether modes are switched depending on a driving state of a vehicle. For example, the HCU 240 may determine an open time of the engine clutch (EC) 130 and may control hydraulic pressure (in the case of a wet EC) or control torque capacity (in the case of a dry EC) when the EC is open. The HCU 240 may determine an EC state (lock-up, slip, open, etc.) and may control a time for stoppage of fuel injection of the engine 110. The HCU 240 may transmit a torque command for controlling torque of the starter generator motor 120 to the MCU 220 to control engine off and may control engine rotational energy recovery. In addition, the HCU 240 may determine a mode switching condition during control of driving mode switching and may control a low-level controller for mode switching.

Needless to say, it will be obvious to one of ordinary skill in the art that the aforementioned relationship between the controllers and functions/divisions of the controllers are exemplary, and thus, the present disclosure is not limited thereto. For example, the HCU 240 may be embodied by allowing any one of controllers other than the HCU 240 to provide a corresponding function, or two or more other controllers may provide the corresponding function in a distributed manner. The controller(s) may be embodied in a hardware manner (e.g., a processor), a software manner, or combination of the hardware and the software manner (i.e., a series of commands), which process at least one function or operation.

A vehicle having the configuration according to one form of the present disclosure may provide a notification function to an occupant of the vehicle by controlling a pitching motion of the vehicle body using the rapid response characteristics of a motor.

Figure 3:
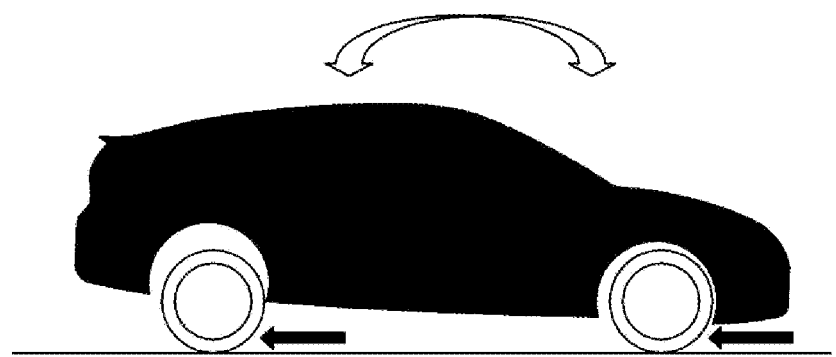
FIG. 3 is a diagram for explaining a pitching motion of a vehicle.

FIG. 3 is a diagram for explaining a pitching motion of a vehicle.

As shown in FIG. 3, when a sudden deceleration situation occurs while the vehicle drives, a pitching motion (in other words, "nosedive"), in which a front part of the vehicle tips down, occurs because the center of gravity of a vehicle body is at a higher position than a suspension.

Because a motor has rapid response characteristics, the pitching motion may be generated by controlling acceleration/deceleration of the motor. Here, it may be possible to provide various types of pitching motions by controlling an acceleration/deceleration cycle, an acceleration/deceleration number of times, an acceleration/deceleration time, or the like. According to another form of the present disclosure, information that is intuitively recognizable by an occupant of the vehicle may be provided by controlling the pitching motion of the vehicle body.

Occupants as well as a driver may be capable of experiencing the pitching motion of the vehicle body, and thus it may be possible to transfer information to all occupants of the vehicle without a separate haptic device. In addition, a notification function may be achieved through the pitching motion in a mode in which noise needs to be minimized, such as in a baby mode or an occupant sleeping mode.

Figure 4:
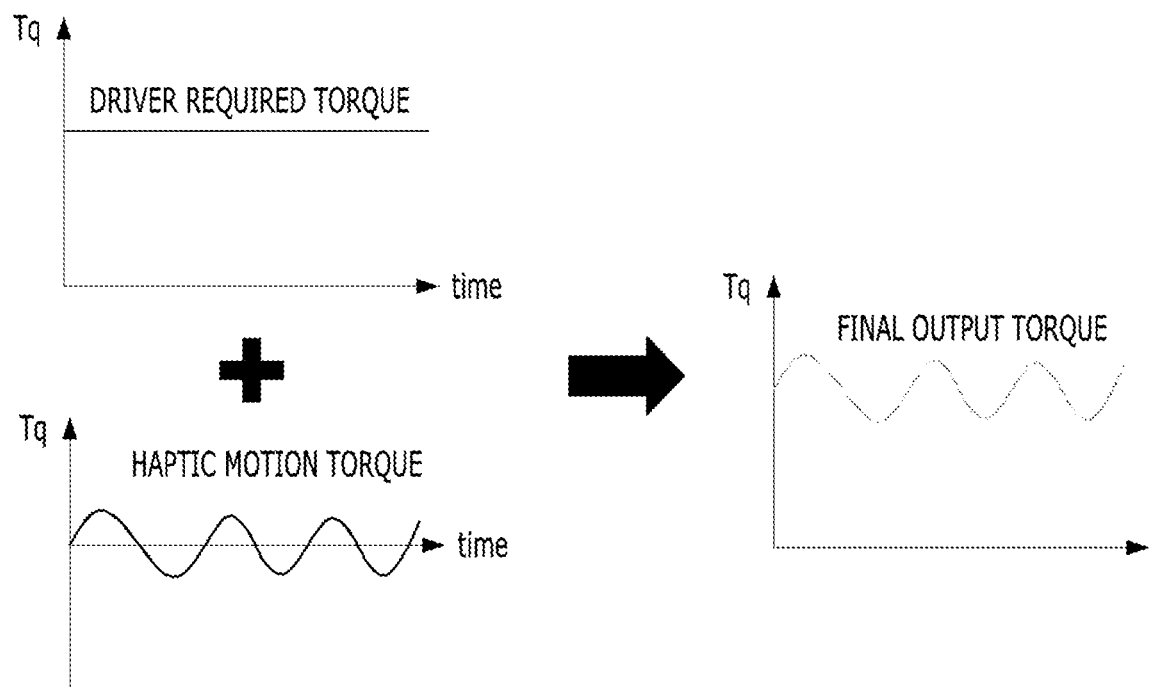
FIG. 4 is a diagram for explaining a torque output method for controlling a pitching motion according to one form of the present disclosure.

FIG. 4 is a diagram for explaining a torque output method for controlling a pitching motion according to an exemplary form of the present disclosure.

Referring to FIG. 4, driver required torque may be a predetermined value. The driver required torque may be determined based on vehicle driving information of accelerator pedal manipulation (ex: sensing value of APS), brake pedal manipulation (ex: sensing value of BPS), or the like and vehicle state information of a gear stage, a vehicle speed, an engine speed (rpm), a state of charge (SoC) of a battery, or the like.

Pitching motion torque for generating the pitching motion may have a sine wave form in which sudden deceleration and sudden acceleration are repeatedly performed.

Lastly, final output torque output to the MCU 220 may be calculated in a waveform for generating the pitching motion while satisfying the driver required torque.

Figure 5:
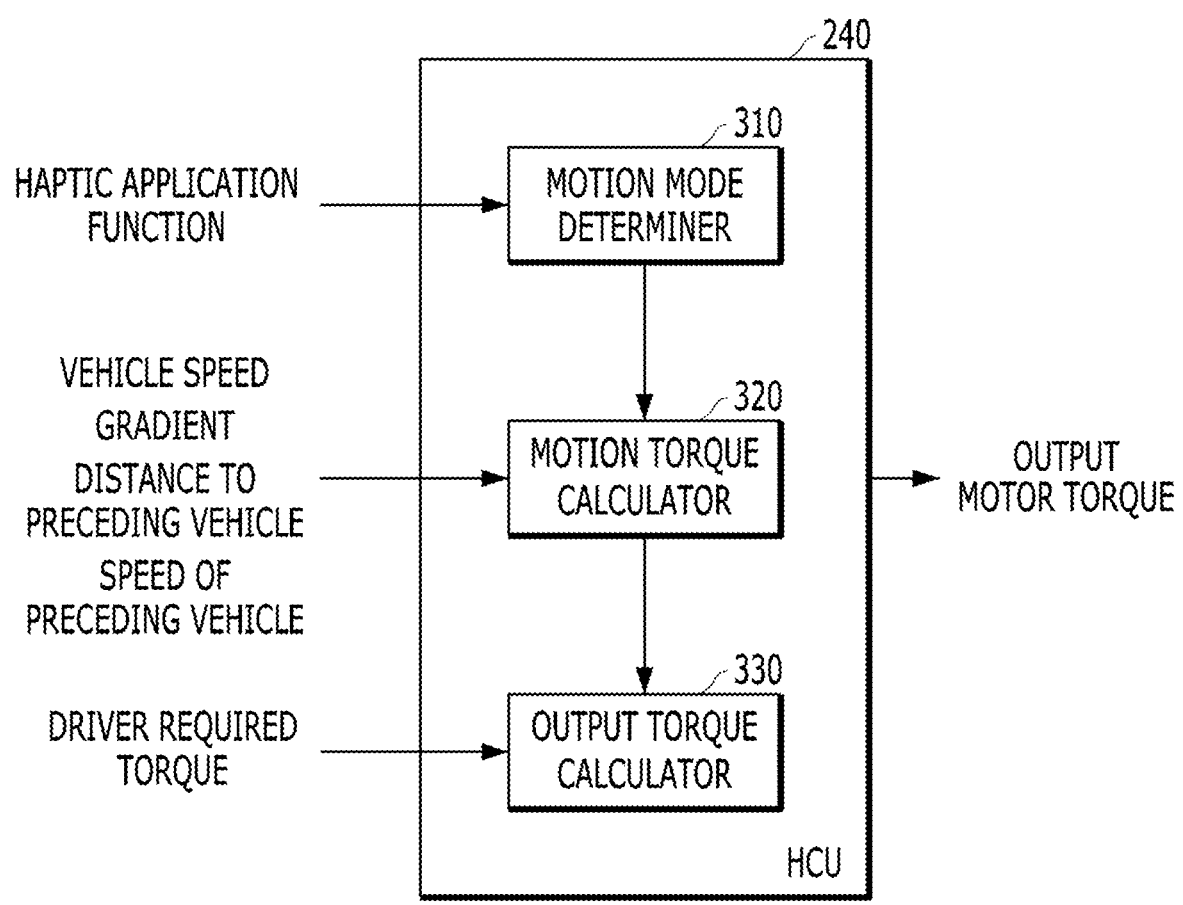
FIG. 5 is a diagram showing an example of the configuration of a controller for achieving a vehicle motion control function according to one form of the present disclosure.

FIG. 5 is a diagram showing an example of the configuration of a controller for achieving a vehicle motion control function according to another form of the present disclosure.

A pitching motion control function may be achieved by the HCU 240 for controlling the overall function of each controller. The HCU 240 may receive information for vehicle pitching motion control from each controller, may calculate motor torque for performing the pitching motion depending on the received information, and may output the motor torque to the MCU 220.

The HCU 240 for performing the control function may include a motion mode determiner 310, a motion torque calculator 320, and an output torque calculator 330.

The motion mode determiner 310 may determine a motion mode based on information received from controllers. The motion mode determiner 310 may receive information such as a current driving mode of a vehicle, a vehicle speed, a road situation, the speed and distance of preceding and rear vehicles, or the like and may determine a motion mode to be executed. In each mode, different pitching motions may be provided to allow a driver to intuitively recognize a current mode. The motion mode may include an acceleration guidance mode, a deceleration guidance mode, and other modes.

The acceleration guidance mode may be a mode in which a vehicle needs to be accelerated based on the vehicle speed, the road situation, the speed and distance of front and rear vehicles, or the like. For example, the motion mode determiner 310 may select the acceleration guidance mode when the situation determined based on the information received from the controllers is a situation immediately prior to switching from an EV mode to an HEV mode, a situation in which a preceding vehicle disappears and is accelerated or drives at a constant speed and is then accelerated when the gradient of a road changes from an uphill road to a downhill road, or a situation in which the rear vehicle is close to a subject vehicle in a passing lane and the subject vehicle is driving to obstruct a path at a threshold distance or greater away from the rear vehicle. In the situation immediately prior to switching from an EV mode to an HEV mode, the driver may recognize the pitching motion based on the acceleration guidance mode and may continuously manipulate the accelerator pedal when higher acceleration capability is desired, and when the driver wants to maintain the EV mode, the driver may reduce a manipulation amount of the accelerator pedal. In the situation in which the preceding vehicle disappears and is accelerated during smart cruise control (SCC) or drives at a constant speed and is then accelerated when the gradient of a road changes from an uphill road to a downhill road, the driver may be allowed to recognize that the vehicle is to be accelerated through the pitching motion of the acceleration guidance mode provided prior to acceleration. In the situation in which the rear vehicle is close to a subject vehicle in a passing lane and the subject vehicle is driving to obstruct a path at a threshold distance or greater away from the rear vehicle, the pitching mode of the acceleration guidance mode may be provided to guide the subject vehicle to be accelerated.

The deceleration guidance mode may be a mode in which a vehicle needs to be decelerated based on a situation of a driving road, a vehicle speed, whether a baby mode is set, or the like. For example, the motion mode determiner 310 may select the deceleration guidance mode and may guide the vehicle to be decelerated when the situation determined based on the information received from the controllers is a situation in which a road ahead is sharply curved or there is a tollgate or a situation of coasting in which the driver needs to decelerate the vehicle. The motion mode determiner 310 may also provide the pitching motion of the deceleration guidance mode to guide the vehicle to be decelerated when the vehicle exceeds a road speed limit or a preset speed limit. In a situation in which sudden acceleration needs to be limited, such as in a back view mode of a baby mode, when the driver accelerates the vehicle at a preset acceleration or greater, the motion mode determiner 310 may provide the pitching motion of the deceleration guidance mode to guide the vehicle to be decelerated.

The other modes may be modes provided when notification that is not related to a vehicle speed is required. For example, the motion mode determiner 310 may select the other modes to allow the driver to recognize the current situation through the pitching motion when notification based on blind spot detection (BSD) is desired. When the driver does not drive, for example, in an autonomous vehicle, the motion mode determiner 310 may select the other modes and may allow the driver to recognize the current situation through the pitching motion prior to arrival at a destination, and it may also be possible to wake up a sleeping driver.

As described above, the motion mode determiner 310 may receive information such as a current driving mode of a vehicle, a vehicle speed, a road situation, the speed and distance of front and rear vehicles, or the like and may determine a motion mode to be executed.

The motion torque calculator 320 may calculate motion torque for providing the pitching motion in the mode determined by the motion mode determiner 310. The motion torque calculator 320 may calculate pitching motion torque by applying the remaining time until an event, the urgency, the importance, a degree by which correction is needed, settings of a driver, and so on. The pitching motion torque may be used to generate the pitching motion by controlling acceleration/deceleration of the motor, and may control the pitching motion by adjusting the period and amplitude of a waveform, a ratio of a pulse width to a predetermined period, the number of waveforms, a slope of a waveform, a shape of the waveform, or the like.

When the remaining time until an event is reduced, the urgency/importance is high, the degree by which correction is needed is high, or the driver sets a haptic response to be strong, the motion torque calculator 320 may calculate a waveform of the pitching motion torque to provide strong haptic feedback to the driver.

The motion torque calculator 320 may calculate the pitching motion torque by applying SoC, a current vehicle speed, a slope, or the like. For example, when the SoC is low, acceleration notification pitching torque may be reduced, and deceleration notification pitching torque may be increased for SoC balancing. In contrast, when the SoC is high, the acceleration notification pitching torque may be increased, and the deceleration notification pitching torque may be reduced. On a downhill road, the acceleration notification pitching torque may be reduced and the deceleration notification pitching torque may be increased. In contrast, on an uphill road, the acceleration notification pitching torque may be increased, and the deceleration notification pitching torque may be reduced. In addition, with respect to the same pitching torque, as a vehicle speed is increased, a larger behavior is expressed, and thus, the vehicle may be controlled to reduce the pitching torque when driving at high speed. When strong haptic feedback is desired, the motion torque calculator 320 may set a period of a waveform of pitching motion torque to be relatively short. For example, as the vehicle approaches a section of a coasting event, the period may become short to provide strong feedback to the driver.

The motion torque calculator 320 may provide strong haptic feedback to the driver by increasing the amplitude of the waveform of pitching motion torque. For example, for speeding notification, when urgency/importance becomes high because there is a speed trap ahead, strong feedback may be provided to the driver by increasing the amplitude of the haptic pitching motion.

The motion torque calculator 320 may provide strong haptic feedback to the driver by increasing the ratio of a pulse width to a predetermined period. For example, in the case of speeding guidance, when a vehicle speed exceeds 40 kph, the degree by which correction is needed may be larger than when vehicle speed exceeds 20 kph, and accordingly, strong haptic feedback may be provided to the driver by increasing the ratio of a pulse width to a predetermined period.

When urgency/importance is high or the driver sets a haptic response many times, the motion torque calculator 320 may increase the number of times of haptic pitching motions.

According to acceleration and deceleration guidance, in the case of acceleration guidance, the motion torque calculator 320 may calculate pitching motion torque to perform a pitching motion in a direction in which the vehicle is accelerated, and in the case of deceleration guidance, the motion torque calculator 320 may calculate the pitching motion torque to perform the pitching motion in which the vehicle is decelerated. When the degree by which correction is needed is high or the driver sets a haptic response to be strong, strong feedback may be provided to the driver by increasing a slope of increase and decrease in torque.

When the remaining time until an event is reduced, the urgency/importance is high, the degree by which correction is needed is high, or the driver sets a haptic response to be strong, the motion torque calculator 320 may provide strong haptic feedback to the driver using a torque waveform having a high rate of change, such as a triangle wave or a square wave. In contrast, when the haptic feedback needs to be reduced, a torque waveform that has a small rate of change and changes smoothly, such as a sine wave, may be used.

As described above, the motion torque calculator 320 may calculate a torque waveform having adjusted strength of haptic feedback by adjusting at least one of the period and amplitude of a waveform of pitching motion torque, a ratio of a pulse width to a predetermined period, the number of waveforms, a slope of a waveform, or a shape of the waveform.

The output torque calculator 330 may calculate final motor torque based on the driver required torque and the waveform of pitching motion torque calculated by the motion torque calculator 320. The finally calculated motor torque may be calculated in a waveform for generating a pitching motion while satisfying the driver required torque.

The HCU 240 for the aforementioned motor torque may be replaced with a component such as a vehicle control unit (VCU) for overall control of a powertrain of an electric vehicle.

Figure 6:
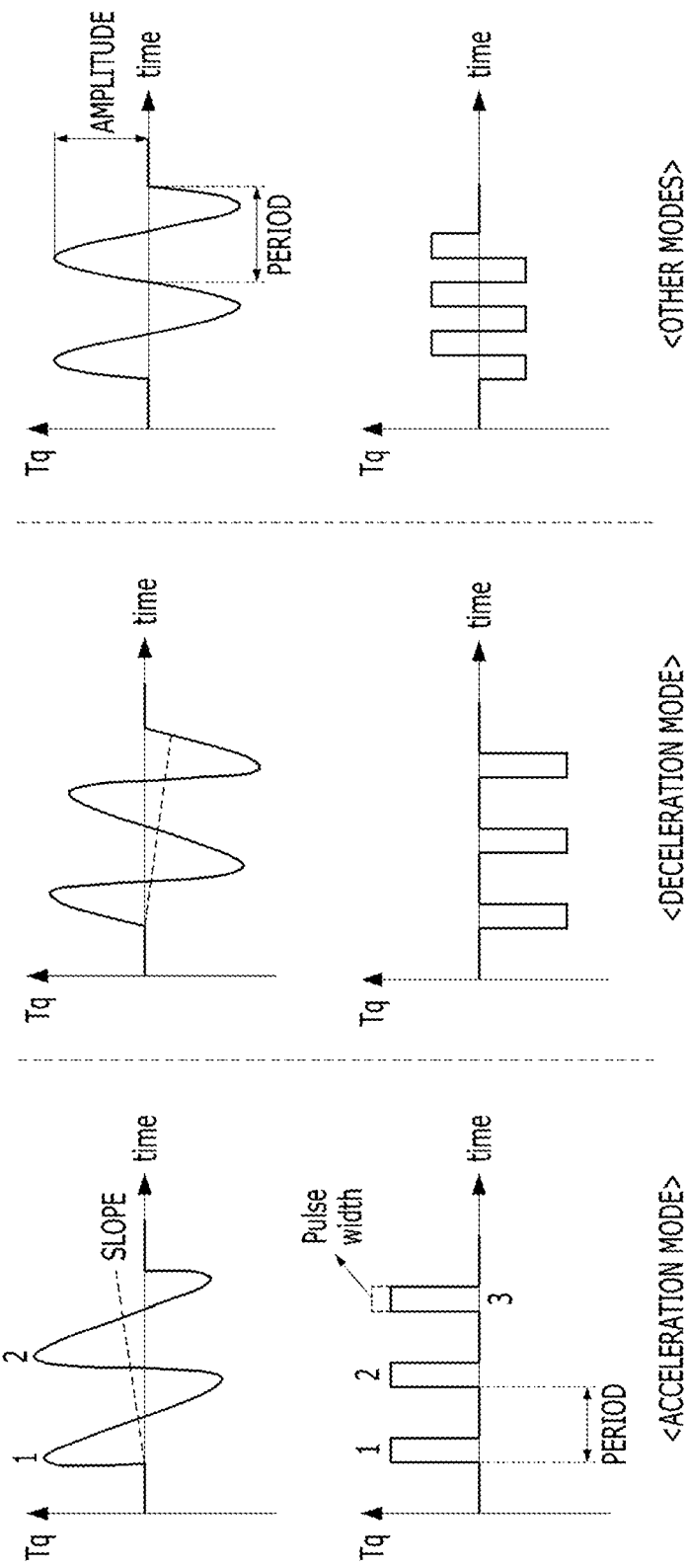
FIG. 6 is a set of graphs showing an example of pitching motion torque output from a motion torque calculator of FIG. 5.

FIG. 6 is a set of graphs showing an example of pitching motion torque output from the motion torque calculator 320 of FIG. 5.

The motion torque calculator 320 may calculate pitching motion torque for providing a pitching motion for each preset pitching motion mode. The motion mode may be provided in various forms depending on a current driving mode of a vehicle, a vehicle speed, a road situation, the speed and distance of preceding and rear vehicles, or the like. When the preset pitching motion mode is an acceleration guidance mode, a deceleration guidance mode, or other modes, the pitching motion torque calculated to provide the pitching motion may have waveforms shown in FIG. 6.

The pitching motion torque in the acceleration guidance mode may be calculated to have a pattern in which the amount of torque increases, and a slope thereof may be set to generate a pitching motion in a direction in which a vehicle is accelerated. When the degree by which correction of acceleration is needed is high or the driver sets a haptic response to be strong, strong feedback may be provided to the driver by further increasing the slope. When the remaining time until an event is reduced, the urgency/importance is high, the degree by which correction is needed is high, or the driver sets a haptic response to be strong, the pitching motion torque for providing strong haptic feedback may be desired. In order to provide strong haptic feedback, a period of a waveform may be reduced, the amplitude thereof may be increased, a ratio of a pulse width to a predetermined period may be increased, or the number of waveforms may be increased. In addition, when a waveform having a high rate of change, such as a triangle wave or a square wave, is applied, strong haptic feedback may be provided.

The pitching motion torque in the deceleration guidance mode may be calculated to have a pattern in which the amount of torque decreases, and a slope thereof may be set to generate a pitching motion in a direction in which a vehicle is decelerated. When the degree by which correction of deceleration is needed is high or the driver sets a haptic response to be strong, strong feedback may be provided to the driver by further increasing the slope. When the current state is a state in which strong haptic feedback needs to be provided, a period of a waveform may be reduced, the amplitude thereof may be increased, a ratio of a pulse width to a predetermined period may be increased, or the number of waveforms may be increased. In addition, when a waveform having a high rate of change, such as a triangle wave or a square wave, is applied, strong haptic feedback may be provided.

Figure 7:
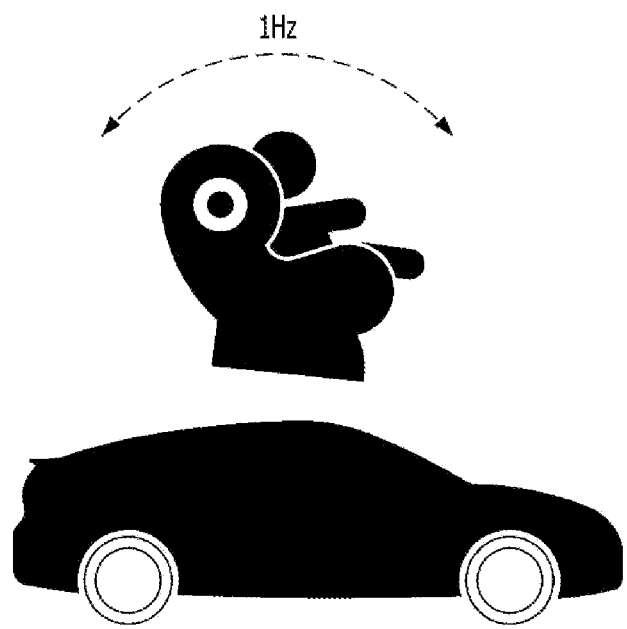
FIG. 7 is a diagram showing an example in which a pitching motion control function is provided according to one form of the present disclosure.

The other modes may be modes provided when notification that is not related to acceleration is desired. The pitching motion torque in the other modes may be calculated not to change the total torque amount. Thus, in the other modes, the pitching motion may be controlled to vibrate a vehicle body at a specific frequency. The pitching motion in the other modes may be applied to perform the notification function that is not related to acceleration, for example, a BSD notification function, or a function of notification that an autonomous vehicle is near the destination. In addition, the torque waveform in the other modes may also be provided for comfort of occupants irrespective of the notification function. For example, as shown in FIG. 7, when a baby mode is set, a pitching motion of the vehicle may be controlled within 1 Hz, which is a comfort level to prevent children from waking. Similarly, when a music mode is set, the pitching motion of the vehicle may be controlled to the beat of music that the driver is listening to.

When the current state is a state in which strong haptic feedback needs to be provided, a period of a waveform may be reduced, the amplitude thereof may be increased, a ratio of a pulse width to a predetermined period may be increased, or the number of waveforms may be increased. In addition, when a waveform having a high rate of change, such as a triangle wave or a square wave, is applied, strong haptic feedback may be provided.

Figure 8:
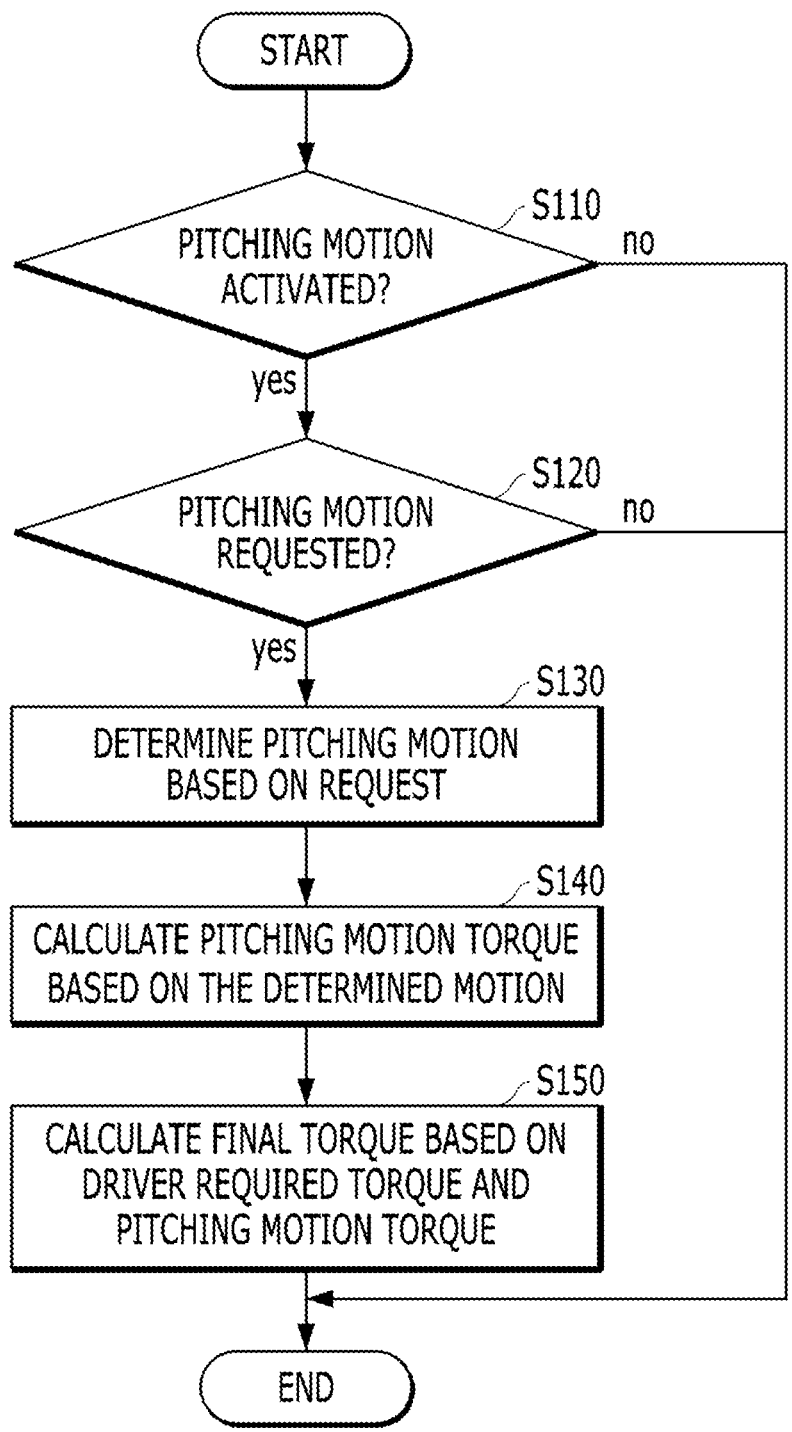
FIG. 8 is a control flowchart of a vehicle according to another form of the present disclosure.

FIG. 8 is a control flowchart of a vehicle according to an exemplary form of the present disclosure.

The HCU 240 may determine whether a pitching motion provision function is activated (S110). The pitching motion provision function may be set by a driver or may be set to be automatically activated in a specific mode such as a baby mode or an autonomous driving mode, or in a specific situation.

When the pitching motion provision function is activated, the HCU 240 may receive information such as a current driving mode of a vehicle, a vehicle speed, a road situation, the speed and distance of preceding and rear vehicles, or the like and may determine whether a pitching motion is requested (S120).

The motion mode determiner 310 of the HCU 240 may determine a motion mode based on the received information (S130).

The motion torque calculator 320 of the HCU 240 may calculate the pitching motion torque for providing the pitching motion in the mode determined by the motion mode determiner 310 (S140). The motion torque calculator 320 may calculate pitching motion torque by applying the remaining time until an event, the urgency, the importance, a degree by which correction is needed, settings of a driver, and so on. The pitching motion torque may be used to generate the pitching motion by controlling acceleration/deceleration of the motor, and may control the pitching motion by adjusting the period and amplitude of a waveform, a ratio of a pulse width to a predetermined period, the number of waveforms, a slope of a waveform, a shape of the waveform, or the like.

The output torque calculator 330 of the HCU 240 may calculate final motor torque based on the driver required torque and the waveform of pitching motion torque calculated by the motion torque calculator 320 (S150). The finally calculated motor torque may be calculated in a waveform for generating a pitching motion while satisfying the driver required torque.

Figure 9:
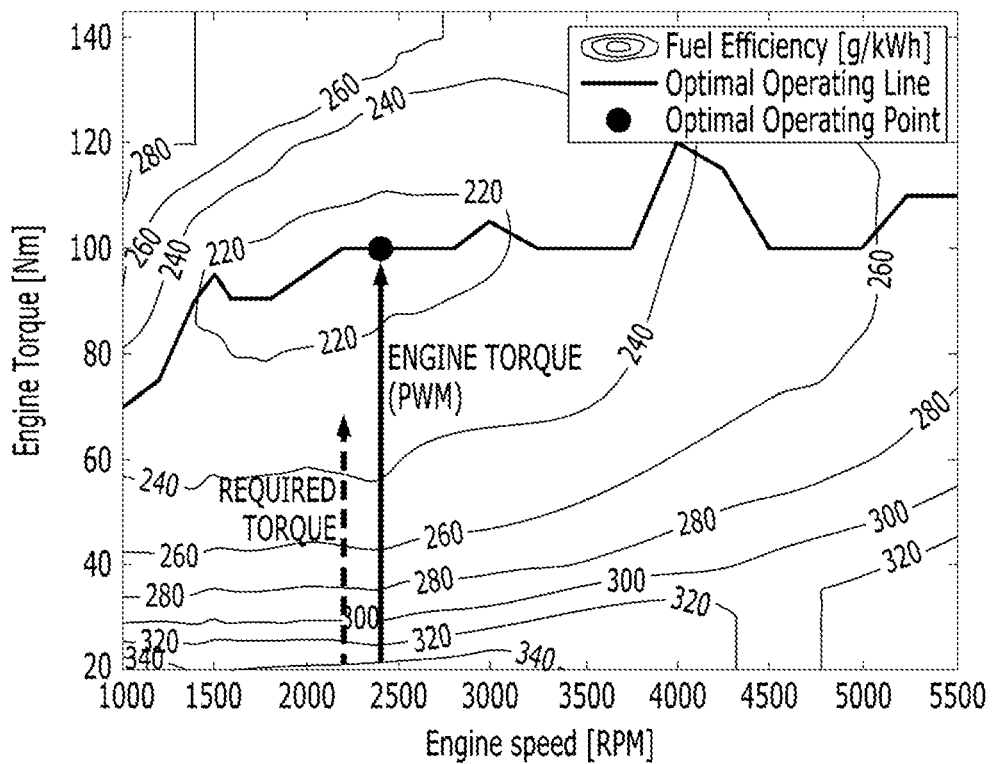
FIGS. 9 and 10 are graphs for explaining a method of controlling torque of a vehicle according to some forms of the present disclosure.
Figure 10:
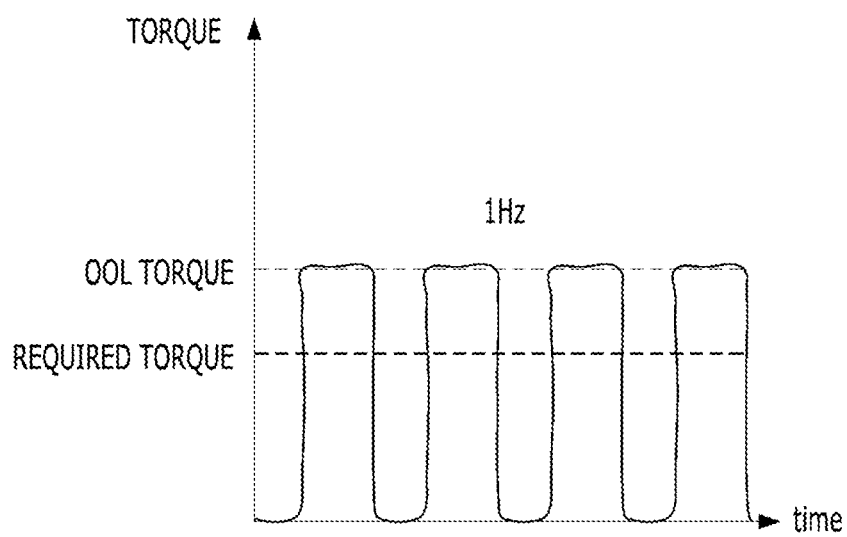

FIGS. 9 and 10 are graphs for explaining a method of controlling torque of a vehicle according to exemplary forms of the present disclosure.

Referring to FIG. 9, fuel efficiency may be improved while satisfying a required pitching frequency by pulse width modulation (PWM) controlling an engine using optimal operating line (OOL) torque based on required torque when the pitching motion is controlled. When torque for generating a pitching motion of a frequency of 1 Hz is calculated in this method, the maximum torque may be set to the OOL torque larger than the required torque and may be calculated in the form of a pulse wave of a period of 1 Hz, as shown in FIG. 10. Thus, torque for providing a pitching motion of 1 Hz and improving fuel efficiency while satisfying the required torque may be calculated.

According to the forms of the present disclosure that have been described thus far, it may be possible to simultaneously transfer information to occupants as well as a driver using a motor of a vehicle by controlling a pitching motion without additional hardware. In addition, a sound may be minimized in a baby mode, an occupant sleeping mode, or the like, and a notification function may be provided through a pitching motion. In addition, various functions may be provided by, for example, providing comfortable vibration irrespective of a notification function or providing a pitching motion to the beat of music.

The vehicle including an electric motor related to at least one form of the present disclosure as configured above may provide a notification function to occupants of the vehicle by controlling a motion of a vehicle body using the motor of the vehicle without additional separate hardware.

In particular, notification information may be simultaneously transferred to occupants as well as a driver through a pitching motion, a sound may be minimized in a baby mode, an occupant sleeping mode, or the like, and a notification function may be provided through a pitching motion, thereby improving satisfaction of occupants of the vehicle.

It will be appreciated by persons skilled in the art that that the effects that could be achieved with the present disclosure are not limited to what has been particularly described hereinabove and other advantages of the present disclosure will be more clearly understood from the detailed description.

The present disclosure can also be embodied as computer readable code on a computer readable recording medium. The computer readable recording medium is any data storage device that can store data which can thereafter be read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy disks, and optical data storage devices.

The above exemplary forms are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method of controlling a vehicle comprising an electric motor, the method comprising:
   determining, by a controller, a pitching motion mode, wherein the pitching motion mode includes at least one of an acceleration guidance mode or a deceleration guidance mode;
   calculating, by the controller, a first torque value for providing a pitching motion based on driving state information including a vehicle speed of the vehicle, a driving mode of the vehicle, and an environment of a driving road on which the vehicle travels, wherein the first torque value is calculated to i) provide the pitching motion in a direction in which the vehicle is accelerated in the acceleration guidance mode and ii) provide the pitching motion in a direction in which the vehicle is decelerated in the deceleration guidance mode;
   calculating, by the controller, a second torque value based on a request of a driver of the vehicle; and
   calculating, by the controller, a final torque value for controlling the electric motor based on the first torque value and the second torque value.

2. The method of claim 1, wherein determining the pitching motion mode includes determining the pitching motion mode based on at least one of urgency, importance, a degree by which correction is needed, settings of the driver, a state of charge (SOC) of a battery, a current vehicle speed, or a slope.

3. The method of claim 1, wherein the pitching motion mode further includes other modes in addition to the at least one of the acceleration guidance mode and the deceleration guidance mode.

4. The method of claim 1, wherein the acceleration guidance mode is selected in at least one of following cases: a current situation is determined as a situation immediately prior to switching from an electric vehicle (EV) mode to a hybrid electric vehicle (HEV) mode, the current situation is determined as a situation in which acceleration begins during autonomous driving, and the current situation is determined as a situation in which the vehicle is driving to obstruct a path, which are determined based on the driving state information.

5. The method of claim 1, wherein the deceleration guidance mode is selected in at least one of following cases: a current situation is determined as a coasting situation in which the vehicle needs to be decelerated, the current situation is determined as a situation in which the vehicle speed exceeds a road speed limit, and a mode for limiting sudden acceleration is selected, which are based on the driving state information.

6. The method of claim 3, wherein the other modes are selected in at least one of following cases: a blind spot detection (BSD) notification is required, the vehicle is near a destination, a baby mode is selected, and a music mode is selected, which are determined based on the driving state information.

7. The method of claim 6, wherein the first torque value is calculated to provide the pitching motion having a preset frequency.

8. The method of claim 1, wherein the first torque value is calculated by determining at least one of a period of a waveform, an amplitude thereof, a ratio of a pulse width to a predetermined period, a number of waveforms, a slope of the waveform, or the waveform, as a determination result based on the driving state information.

9. The method of claim 8, wherein the first torque value is calculated through at least one of a procedure of calculating the first torque value to reduce the period of the waveform, a procedure of calculating the first torque value to increase the amplitude, or a procedure of calculating the first torque value to increase the ratio of the pulse width to the predetermined period.

10. The method of claim 8, wherein the first torque value is calculated to have a waveform having a high rate of change, including a triangle wave and a square wave.

11. A non-transitory computer-readable recording medium having a program recorded thereon, the program to direct a processor to perform acts of:
    determining, by a controller, a pitching motion mode, wherein the pitching motion mode includes at least one of an acceleration guidance mode or a deceleration guidance mode;
    calculating a first torque value for providing a pitching motion based on driving state information including a vehicle speed of a vehicle, a driving mode of the vehicle, and an environment of a driving road on which the vehicle travels, wherein the first torque value is calculated to i) provide the pitching motion in a direction in which the vehicle is accelerated in the acceleration guidance mode and ii) provide the pitching motion in a direction in which the vehicle is decelerated in the deceleration guidance mode;
    calculating a second torque value based on a request of a driver of the vehicle; and
    calculating a final torque value for controlling a motor based on the first torque value and the second torque value.

12. A vehicle comprising an electric motor, the vehicle comprising:
    a mode determiner configured to determine a pitching motion mode based on driving state information including a vehicle speed of the vehicle, a driving mode of the vehicle, and an environment of a driving road on which the vehicle travels, wherein the mode determiner is configured to determine the pitching motion mode as at least one of an acceleration guidance mode or a deceleration guidance mode;
    a first calculator configured to calculate a first torque value for providing a pitching motion based on the determined pitching motion mode and the driving state information, wherein the first calculator is configured to calculate first torque value is calculated to i) provide the pitching motion in a direction in which the vehicle is accelerated in the acceleration guidance mode and ii) provide the pitching motion in a direction in which the vehicle is decelerated in the deceleration guidance mode; and
    a second calculator configured to calculate a final torque value for controlling the electric motor based on the first torque value and a second torque value calculated based on a request of a driver of the vehicle.

13. The vehicle of claim 12, wherein the mode determiner is further configured to determine the pitching mode as other modes in addition to the at least one of an acceleration guidance mode and the deceleration guidance mode.

14. The vehicle of claim 13, wherein the mode determiner is configured to:
    select the acceleration guidance mode in at least one of following cases: a current situation is determined as a situation immediately prior to switching from an electric vehicle (EV) mode to a hybrid electric vehicle (HEV) mode, the current situation is determined as a situation in which acceleration begins during autonomous driving, and the current situation is determined as a situation in which the vehicle is driving to obstruct a path, which are determined based on the driving state information, select the deceleration guidance mode in at least one of following cases: the current situation is determined as a coasting situation in which the vehicle needs to be decelerated, the current situation is determined as a situation in which the vehicle speed exceeds a road speed limit, and a mode for limiting sudden acceleration is selected, which are determined based on the driving state information, and select the other modes in at least one of following cases: a blind spot detection (BSD) notification is required, the vehicle is near a destination, a baby mode is selected, and a music mode is selected, which are determined based on the driving state information.

15. The vehicle of claim 14, wherein:
the first calculator is configured to calculate the first torque value to provide the pitching motion having a preset frequency when the other modes are selected.

16. The vehicle of claim 12, wherein the first calculator is configured to calculate the first torque value by determining at least one of a period of a waveform, an amplitude thereof, a ratio of a pulse width to a predetermined period, a number of waveforms, a slope of the waveform, or the waveform, based on the determined pitching motion mode and the driving state information.

17. The vehicle of claim 16, wherein the first torque value is calculated through at least one of a procedure of calculating the first torque value to reduce the period of the waveform, a procedure of calculating the first torque value to increase the amplitude, or a procedure of calculating the first torque value to increase the ratio of the pulse width to the predetermined period.

* * * * *